United States Patent [19]

White et al.

[11] Patent Number: 5,198,572

[45] Date of Patent: Mar. 30, 1993

[54] COPOLYMERS OF DICARBOXYLIC ACIDS AND SALICYLIC ACIDS

[75] Inventors: Dwain M. White, Schenectady; Laura A. Socha, Troy, both of N.Y.

[73] Assignee: General Electric Company, Schenectady, N.Y.

[21] Appl. No.: 650,114

[22] Filed: Feb. 4, 1991

[51] Int. Cl.$^5$ .............................................. C07C 69/76
[52] U.S. Cl. ...................................... 560/86; 560/190; 560/198
[58] Field of Search ...................... 560/190, 198, 86

[56] References Cited

U.S. PATENT DOCUMENTS

| | | | |
|---|---|---|---|
| 4,315,086 | 2/1982 | Ueno et al. | 525/391 |
| 4,338,421 | 7/1982 | Maruyama et al. | 525/397 |
| 4,600,741 | 7/1986 | Aycock et al. | 524/139 |
| 4,760,118 | 7/1988 | White et al. | 525/397 |
| 4,873,286 | 10/1989 | Gallucci et al. | 525/92 |
| 4,988,775 | 1/1991 | Sivavec et al. | 525/397 |

FOREIGN PATENT DOCUMENTS

91/09831  7/1991  World Int. Prop. O. .

*Primary Examiner*—Paul J. Killos
*Attorney, Agent, or Firm*—William H. Pittman

[57] ABSTRACT

A composition and method of making copolymers of salicylic acid and dicarboxylic acid by reacting at least one salicylic acid with at least one dicarboxylic acid and at least one acetic anhydride for every salicylic and dicarboxylic acid present. The composition is useful for functionalizing polyphenylene ethers that are capable of forming copolymers useful for compatibilizing blends of polyphenylene ethers and polyamides.

5 Claims, No Drawings

COPOLYMERS OF DICARBOXYLIC ACIDS AND SALICYLIC ACIDS

This invention relates to copolymers of dicarboxylic acids and salicylic acid.

In one of its aspects the present invention provides, a composition of polymer molecules having structural units of the formula:

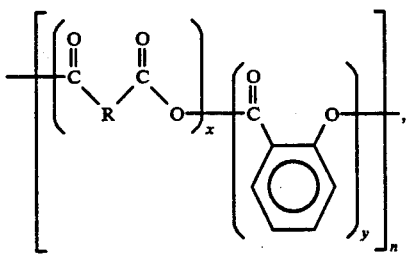

wherein R is a radical such that a stable intramolecular anhydride is not formed and x, y, and n are independently greater than or equal to 1. Suitable R values include

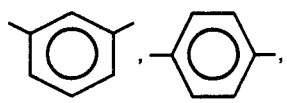

$(CH_2)_m$ and trans —CH=CH— wherein m is at least four.

The present invention also provides a method of preparing copolymers of dicarboxylic acid and salicylic acid. The copolymers of the present invention may be produced by contacting salicylic acid, dicarboxylic acid and acetic anhydride in equimolar amount with respect to the salicylic and dicarboxylic acid present at a temperature and pressure sufficient to distill off the acetic acid and any excess acetic anhydride if any excess is used. In accordance with the method of the present invention the reaction is preferably heated at reflux at about 140° C. for about 10 to about 20 hours and then the acetic acid is distilled off under vacuum conditions. A suitable amount of salicylic acid present in accordance with the present invention ranges from about 25 percent to about 75 percent of the reaction mixture. A suitable amount of dicarboxylic acid present in accordance with the present invention ranges from about 75 percent to about 25 percent of the reaction mixture. Preferably the amount of salicylic acid and dicarboxylic acid present in the reaction mixture is about 50 percent respectively. Dicarboxylic acids preferable for use in the present invention include isophthalic acid, terephthalic acid, fumaric acid and aliphatic acids having at least 6 carbon atoms Salicylic acids useful in the present invention are commercially available from Monsanto.

These copolymers of salicylic acid and dicarboxylic acid are of great use as capping agents for polyphenylene ether. Such capped polyphenylene ethers are disclosed and claimed in commonly assigned and copending application 07/650,128, now U.S. Pat. No. 3122575. To produce the above mentioned capped polyphenylene ethers a preformed copolymer made from salicylic acid and dicarboxylic acid described hereinabove is reacted with at least one polyphenylene ether. The polyphenylene ether may also be prepared by pre-extrusion with vacuum venting to remove amines and other impurities that can react with the capping agent. The preferred polyphenylene ether is poly(2,6-dimethyl-1,4-phenylene ether). To produce the capped polyphenylene ethers of the present invention the salicylic acid/dicarboxylic acid copolymer is preferably contacted under reactive conditions with the polyphenylene ether or optionally the pre-extruded polyphenylene ether. The reactive conditions preferably include extrusion.

While not critical, the amount of dicarboxylic acid salicylic acid copolymer present is generally about 1% to about 10% based on weight of the polyphenylene ether present. The ratio of salicylic acid to dicarboxylic acid usually ranges from about 3:1 to about 1:3. The reaction occurs at a temperature ranging from about 250° C. to about 350° C.

In order that those skilled in the art may be better able to practice the present invention, the following examples are given as illustrations of the preparation of the dicarboxylic acid/salicylic acid copolymers of the present invention. It should be noted that the invention is not limited to the specific details embodied in the examples.

EXAMPLE 1

Salicylate/Isophthalate Copolymer

Salicylic acid (276 g, 2 mol), isophthalic acid (332 g, 2 mol) and 800 mL acetic anhydride were charged into a flask and heated under nitrogen at reflux for 17 hrs to form a clear solution. A vacuum (~10 mm Hg) was applied and ~150 mL acetic acid/acetic anhydride was removed. The vacuum was increased to less than 1 mm Hg and additional acetic acid was removed over a period of 2 hrs. During this time the temperature of the reaction mixture increased to 240° C. The clear melt was poured onto Teflon coated aluminum foil and allowed to cool to form a transparent, light colored glass (weight: 512 g) which was then ground up into a powder.

NMR spectra were measured on a General Electric QE-300 NMR Spectrometer. A $^1$H NMR analysis showed only a trace of acetate or acetic acid, no starting materials. A $^{13}$C NMR analysis revealed 22 weak to strong resonances at 123–134 ppm, 8 weak to medium resonances at 150–151 ppm, 26 weak resonances at 150–167 ppm. DSC: Tg at 85° C., Tm at 255° C. (second heat), 240° C. (third heat). Infrared spectra for the copolymers were measured in chloroform solution and in KBr pellets on a GE FTIR spectrometer. The IR analysis revealed (in CHClhd 3): 1773 (weak), 1752 (strong), 1695 (medium) cm−1.

The procedure was repeated with 1 mole of salicylic acid and 3 moles of isophthalic acid to produce 520 g of a light colored, translucent glassy product. DSC: Tg at 100° C. (second heat), 132° C. (third heat).

EXAMPLE 2

Salicylate/Terephthalate Copolymer

The procedure described in Example 1, above, was used on the same scale with terephthalic acid instead of isophthalic acid using a 1 to 1 ratio of reactants. The final product was a light colored, translucent glass which after grinding to a powder weighed 486 g. NMR spectra indicated very little acetate and no starting materials were present.

EXAMPLE 3

Salicylate/Suberate Copolymer

The procedure described in Example 1, above, was used with suberic acid (315 g, 1.8 mol), salicylic acid (250 g, 1.8 mol) and 725 mL acetic anhydride. The reaction mixture formed a clear solution and then a clear melt and the final product was a light colored, transparent, slightly fluid glass which weighed 489 g. NMR spectra indicated very little acetate and no starting materials were present.

EXAMPLE 4

Salicylate/Sebacate Copolymer

The procedure described in Example 1, above was used with sebacic acid (50 g, 0.5 mol), salicylic acid (69 g, 0.5 mol) and 200 mL acetic anhydride. The reaction mixture formed a clear solution and then a clear melt and the final product was a dark colored, transparent, slightly fluid glass which weighed 127 g. NMR spectra indicated very little acetate and no starting materials were present.

EXAMPLE 5

Salicylate/Fumarate Copolymer

The procedure described in Example 1, above, was used with fumaric acid (58 g, 0.5 mol), salicylic acid (69 g, 0.5 mol) and 200 mL acetic anhydride. The reaction mixture formed a clear solution and then a clear melt and the final product was a dark colored, transparent glass which weighed 70.5 g NMR spectra indicated very little acetate and no starting materials were present.

TABLE 1

Copolymers of Salicylic Acid and Dicarboxylic Acids (1:1 Molar Ratios)

| Dicarboxylic Acid | Distinctive IR Bands Not Found in Pure Polysalicylate | DSC Transitions (°C.) Tg | DSC Transitions (°C.) $T_m$ | $\overline{M}w$* (PS cal) |
|---|---|---|---|---|
| Isophthalic | 3000–2600, 175, 1697,1413 722 | 85 | 255 | ~3000 |
| Terephthalic | 3000–2500, 1794, 1960, 1427 746 | ~105 | ~330 | ~1500 |
| Suberic | 2930, 2855, 1812, 1702 1413 | — | — | 1100 |
| Sebacic | 2940, 2860, 1813,1702, 1412, 1368 | — | — | 1300 |
| Fumaric | 1850, 1782, 1705 | — | — | — |

*Weight average molecular weight by gel permeation chromatography calibrated with polysalicylate standards.

Table 1 describes products prepared from mixtures of salicylic acid and various dicarboxylic acids.

The preparation of the capped polyphenylene ether is illustrated by the following example.

EXAMPLE 6

Salicylate/Isophthalate Capped Polyphenylene Ether

A dry blended mixture of 2020 g polyphenylene ether (commercial resin with an intrinsic viscosity of 0.46 dL/g) and 202 g of salicylate/isophthalate (1:1 molar ratio) copolymer was extruded in a Werner-Pfleider 28 mm twin screw extruder equipped with a vacuum venting port and a devolatilizing screw (zones 1–5: 180° C./290° C./300° C./310° C./310° C.; die: 320° C.) and the extrudate was pelletized with a mechanical chopper. The feed rates for the extrusions were about 9 pounds per hour. A portion of the extrudate (~40 g) was stirred in chloroform and the solution filtered to remove any trace of insoluble material. Addition of methanol to the filtrate caused the polymer to precipitate. It was washed with methanol and dried at 70.C in a vacuum oven for 20 hours. Infrared spectra were measured on a General Electric QE FTIR spectrometer using carbon disulfide to dissolve the functionalized polyphenylene ethers. IR analysis at 3610 cm−1 showed 0.003 wt % OH, which corresponded to 97% capping. These capped polyphenylene ethers are useful in compatibilizing blends of polyphenylene ethers and such materials as polyamides, polycarbonates, and polyesters. Compositions comprising copolymers of these capped polyphenylene ethers and polyamides are disclosed and claimed in commonly assigned docket RD-20934.

Obviously, other modifications and variations of the present invention are possible in light of the above teachings. It is therefore to be understood that changes may be made in particular embodiments of the invention described which are within the full intended scope of the invention as defined by the claims. It is to be further understood that all patents mentioned above are to be incorporated herein by reference.

What is claimed is:

1. A method of making a copolymer of salicylic and dicarboxylic acid comprising:
   a. contacting, at a temperature in the range of about 250°–350° C., salicylic acid, at least one dicarboxylic acid, and acetic anhydride wherein the acetic anhydride is in a molar ratio of about 1:1 with respect to the salicylic and dicarboxylic acid present; and
   b. distilling off any excess acetic anhydride.

2. A method according to claim 1 wherein the dicarboxylic acid is selected from the group consisting of isophthalic acid, terephthalic acid, fumaric acid, and alkanedioic acids having at least 4 carbon atoms.

3. A method according to claim 1 wherein the ratio of salicylic acid to dicarboxylic acid present ranges from about 1:3 to about 3:1.

4. A method according to claim 1 wherein the molar ratio of dicarboxylic acid to salicylic acid present is about 1:1.

5. A polymer comprising structural units of the formula

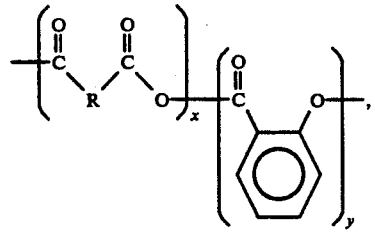

wherein R is

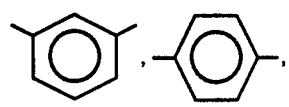

—$(CH_2)_m$— or trans —CH=CH—, m is at least 4 and each of x and y is independently at least 1.

* * * * *